Aug. 1, 1950 G. H. RENDEL 2,517,353
MOTOR SPEED REGULATOR
Filed July 12, 1948
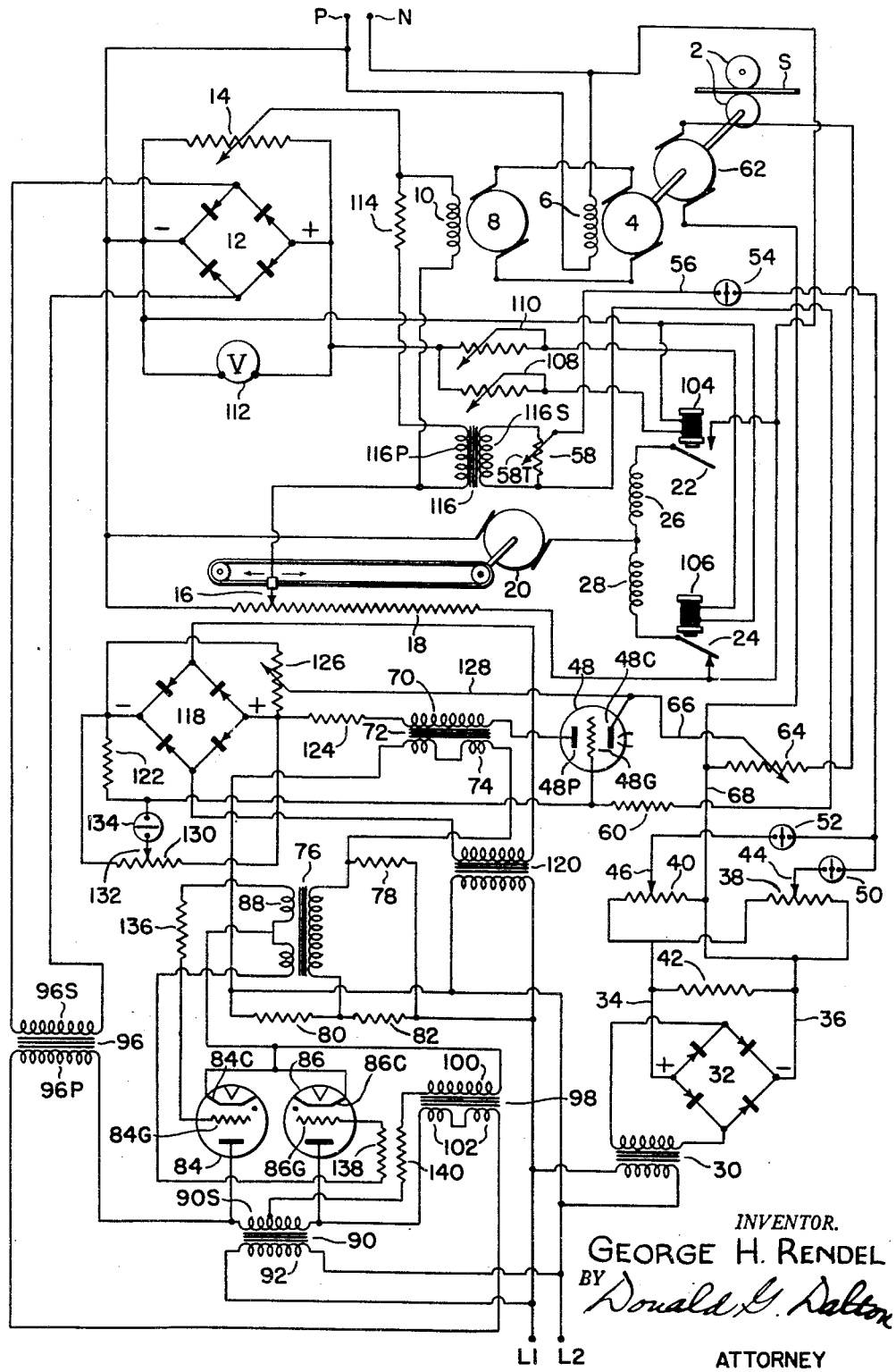
INVENTOR.
GEORGE H. RENDEL
BY Donald G. Dalton
ATTORNEY

UNITED STATES PATENT OFFICE 2,517,353

MOTOR SPEED REGULATOR

George H. Rendel, Pittsburgh, Pa., assignor to Carnegie-Illinois Steel Corporation, a corporation of New Jersey Application July 12, 1948, Serial No. 38,257

14 Claims. (Cl. 318—158)

This invention relates to a speed regulator for a motor and more particularly to a regulator for a motor which is driven from a generator having a field winding. In the operation of strip processing lines, such as electrolytic tinning lines, it is necessary to accelerate and decelerate the lines at frequent intervals to facilitate joining coils of strip end to end. In order to minimize the stresses on the processing equipment and on the strip being processed, it is desirable to accelerate and decelerate the line at uniform rates. This also results in an increase in the percentage of prime material produced during speed changing periods. It is also essential that the processing line be accelerated to the same operating speed after each deceleration. During normal operation of the line, there is a tendency for the speed to fluctuate and it is desirable to eliminate or greatly reduce these fluctuations. Speed regulators now used on such processing lines do not function satisfactorily because of: (1) erratic control of acceleration and deceleration; (2) inability to accurately maintain a uniform rate of operating speed; and (3) the inability to accurately duplicate performance on the various required operations. When mechanical regulators are used, the operation is sluggish due to the large inertia of the various parts.

It is therefore an object of my invention to provide a motor control having the above mentioned desirable characteristics.

Another object is to provide such a control having means for effecting a course, or approximate setting, over a wide range and a vernier control for operating with a high degree of sensitivity over a narrow range.

These and other objects will be more apparent after referring to the following specification and attached drawing, in which the single figure is a schematic wiring diagram of my control.

Referring more particularly to the drawing, the reference numeral 2 indicates a pair of rolls for pulling a strip S through a processing line such as an electrolytic tinning line. The rolls 2 are driven from a motor 4 in the usual manner. The motor 4 is provided with a shunt field winding 6. Excitation power for the winding 6 is obtained from a substantially constant potential direct current source P and N. Power for driving the motor 4 is supplied from a generator 8 which is provided with a shunt field winding 10. Excitation power for the shunt field winding 10 is also provided from the direct power source P and N. One side of the winding 10 is connected in circuit with the regulator network consisting of a dry disk rectifier 12 and shunting resistor 14 which are connected to the line P. In place of the rectifier 12 other sources of controlled voltage may be used. The other side of the winding 10 is connected to the line N through the sliding arm 16 of a motor operated potentiometer rheostat 18. The rheostat 18 has a driving motor 20 which is connected to the line P directly and to the line N through either normally open contact 22 or normally closed contact 24. Two fields 26 and 28 are connected in series with the armature of motor 20. The arrangement is such that when the contact 22 is closed, the slide wire 16 is moved in the proper direction to increase the power to shunt field winding 10 to thereby increase the voltage output of generator 8, which in turn causes the motor 4 to increase its speed. When the contact 24 is closed, the slide wire 16 is moved in the proper direction to decrease the power to shunt field winding 10, thereby decreasing the voltage output of generator 8 to decrease the speed of motor 4.

An isolated constant potential direct current power source is provided as a reference voltage from the A. C. power lines L—1 and L—2 in the following manner. The lines L—1 and L—2 are connected to the primary of a transformer 30 and a dry disk type rectifier 32 is supplied with power from the secondary thereof. The substantially constant D. C. potential across the positive and negative terminals of rectifier 32 is connected by means of the lines 34 and 36 to potentiometers 38 and 40. A resistance 42 is provided across the lines 34 and 36. The potentiometers 38 and 40 are so designed that the potentiometer 38 will give the required reference voltage for relatively low operating speeds while potentiometer 40 will give the required reference voltage for relatively high operating speeds. The contact arms 44 and 46 of potentiometers 38 and 40, respectively, are movable so that the reference voltage can be varied to obtain various operating speeds. The reference voltage from the potentiometers 38 and 40 is selectively impressed on the grid 48G of detector tube 48. It will be seen that the potentiometers 38 and 40 are connected in parallel with a switch 50 being provided in the line from potentiometer 38 and a switch 52 being provided in the line from potentiometer 40. The switches are so arranged that when one is closed, the other will be open. A switch 54 is connected in the line 56 leading to the grid 48G and controls the starting and stopping of the line. Provided in the line 56 are resistors 58 and 60.

Connected to the rolls 2 or motor 4 is a tachometer generator 62 which is driven at line or motor speed. A variable resistor 64 is connected across the output terminals of the generator 62. The voltage drop across resistor 64 is impressed on the cathode 48C through the line 66. A line 68 connects the negative terminal of the generator 62 to the line 36. The detector tube 48 controls the flow of current through the D. C. saturating winding 70 of a saturable core reactor 72. The flow of direct current through winding 70 controls the reactance of the A. C. winding 74 of the reactor, which in turn, regulates the phase angle of a grid transformer 76, by the well known means of a phase shifting network comprised of the saturable reactor 72, resistors 78, 80 and 82 and the transformer 76. Power for energizing this phase shift network is supplied from the lines L—1 and L—2. This phase shift network controls the power output of thyratron tubes 84 and 86 through the secondary windings 88 of the transformer 76. Power for the thyratron tubes 84 and 86 and the regulator is supplied by a center tap power transformer 90, whose primary winding 92 receives power from the lines L—1 and L—2. An isolating transformer 96 is provided to insulate the thyratron control circuit from the circuit supplying power to the dry disk rectifier 12, which latter circuit is provided with power from the secondary winding 96S of the transformer 96. A saturable core reactor 98 controls the flow of current to the primary 96P of the transformer 96. Direct current saturating power for the winding 100 of the reactor 98 is controlled by the conduction of current through tubes 84 and 86. As the saturating current is increased through the winding 100, the reactance of reactor A. C. windings 102 is decreased thereby reducing the voltage drop across the A. C. terminals of the reactor 98, thus increasing the impressed voltage across the primary winding 96P which raises the voltage output from the secondary winding 96S and increases the applied voltage on the A. C. terminals or dry disk rectifier 12. An increase in the voltage applied to rectifier 12 raises the rectified voltage output therefrom which increases the voltage impressed on resistor 14 and forces more current through the shunt field winding 10 to increase the power output from generator 8, thus increasing the rotational speed of motor 4.

Voltage sensitive relays 104 and 106 are connected across the D. C. terminals of rectifier 12 through adjustable resistors 108 and 110, respectively. The contact 22 of relay 104 is normally open and the contact 24 of relay 106 is normally closed. In normal operation, the resistor 110 is adjusted to a value which will pass sufficient current to energize relay 106 when the voltage output from rectifier 12 is approximately 40% of its rated output and the resistor 108 is adjusted to a value which will pass sufficient current to energize relay 104 when the voltage output from rectifier 12 is approximately 60% of its rated output. A volt meter 112 is connected across the direct current terminals of rectifier 12 to indicate the voltage output therefrom. This provides a convenient means for testing the effect of the regulator and also facilitates checking the potential values at which relays 104 and 106 are energized and deenergized. Connected in the circuit with the shunt field winding 10 is a current limiting resistor 114 and the primary winding 116P of an anti-hunting transformer 116. The secondary winding 116S of the transformer is connected in parallel with the adjustable resistor 58.

A rectifier 118, which is provided with power from the lines L—1 and L—2 through a transformer 120, has its negative terminal connected through a resistance 122 to the grid 48G of the detector tube and its positive terminal connected to the plate 48P of the detector tube through resistance 124 and the D. C. winding 70 of the reactor 72. A voltage dividing resistor 126 is connected across the terminals of the rectifier 118. A tap 128 from the cathode 48C is connected to the resistor 126. A potentiometer 130 is connected across the positive and negative terminals of rectifier 118 and is provided with a movable contact arm 132. A switch 134 is provided in the line leading from the contact arm 132 to the negative terminal of rectifier 118.

Current limiting resistors 136 and 138 are connected in the circuit leading from the secondary winding 88 of the transformer 76 to the grids 84G and 86G, respectively. A current limiting resistor 140 is provided in the circuit leading from the secondary winding 90S to the D. C. winding 100.

The operation of the device is as follows:

Assuming that the line is at rest and it is desired to start the line at a low speed, the switches 50 and 54 are closed and the contact arm 44 is set to give the desired reference voltage. This energizes the line 56 with the positive potential of the reference voltage and transmits it through the adjustable resistor 58 and grid resistor 60 to the grid 48G of the detector tube. The anti-hunting transformer's secondary winding 116S provides a potential having directional polarity during periods of voltage change on the shunt field winding 10 which stabilizes the regulator operation in the following conventional manner. The impressed voltage change of the primary winding 116P induces a potential in the secondary winding 116S and across the terminals of resistor 58 during all voltage changing periods of the generator shunt field winding 10. The adjustable tap 58T on resistor 58 transmits a portion of this induced potential to wire 56, which potential either adds to or subtracts from the potential difference between lines 56 and 66, depending on whether the processing line is being accelerated or decelerated, thus effecting the value of the potential of grid 48G with respect to the cathode 48C. When the switches 50 and 54 are first closed, the line is at rest and the electric output of tachometer generator 62 is zero so that the grid element 48G is more positive than the cathode element 48C. Under these conditions the detector tube 48 will conduct current, causing current to flow through the D. C. winding 70 of reactor 72 from the rectifier 118 by way of the wire 128, tube 48, reactor winding 70 and current limiting resistor 124 to the rectifier 118. The direct current flowing through winding 70 decreases the reactance in the A. C. winding 74, which through the phase shift network advances the phase angle of the grids 84G and 86G to increase the current flow through tubes 84 and 86. The direct current flow through tubes 84 and 86 causes current to flow through saturating winding 100 by way of the center tap on secondary winding 90S, through the current limiting resistor 140, through winding 100 to cathode elements 84C and 86C, through thyratron tubes 84 and 86 to the end taps on secondary winding 90S. The increased current flowing through winding 100 decreases the reactance in the A. C. winding 102, thereby lowering the potential drop thereacross to increase the applied potential on the primary winding 96P of the isolating transformer.

This causes a corresponding increase in potential to appear across the windings 96S, which raises the impressed voltage on rectifier 12 with a corresponding increase in the D. C. voltage output therefrom. This in turn causes an increase in the current flowing in winding 10, thus causing the generator output to increase, which starts the motor 4 in operation and increases its speed. When the voltage output from rectifier 12 is raised to approximately 40% of its rated value, the relay 106 becomes energized, thereby opening its contact 24. When the rectifier output voltage is increased to approximately 60% of its rated value, relay 104 becomes energized, thus closing its contact 22 which energizes motor field winding 26 and the armature of motor 20. This moves the sliding arm 16 of rheostat 18 in the proper direction to raise the voltage on generator 8, thereby further increasing the speed of motor 4. The sliding arm 16 of rheostat 18 will continue to move in the direction to raise the generator voltage until the detector tube 48G is nearly balanced in the manner described hereinafter. As the speed of motor 4 and the processing line increases, the electric output from tachometer generator 62 increases proportionally. The voltage drop across voltage dividing resistor 64 will also increase, thus making the potential of cathode 48C positive when referred to the common wire 68 connecting the negative terminals of the tachometer generator 62 and rectifier 32. This decreases the difference in potential between the cathode 48C and the grid 48G. When the potentials of the cathode 48C and grid 48G become approximately equal, the grid 48G assumes complete control of the flow of current through detector tube 48. As the current flow through tube 48 is decreased as a result of the approaching voltage equilibrium between the cathode and grid, a corresponding decrease in current flow occurs in the D. C. winding 70 of the saturable reactor 72. This retards the phase angle by means of the phase shift network and thereby lowers the output from the tubes 84 and 86, which in turn, reduces the saturating current in winding 100, thereby increasing the reactance in A. C. winding 102. This reduces the impressed voltage on primary winding 96P and lowers the impressed voltage on the A. C. terminals of rectifier 12, which in turn, reduces the voltage output therefrom. When the voltage output from rectifier 12 is lowered to a value of approximately 60% of its rating, relay 104 becomes deenergized, thus opening its contact 22 and deenergizing the rheostat driving motor 20. If the operating speed changes even very slightly, there will be a potential difference between the grid and cathode of tube 48 which, in the manner described above, will increase or decrease the voltage of rectifier 12, thereby increasing or decreasing the impressed voltage on field winding 10 to raise or lower the speed of motor 4. It will be understood that when there is no potential difference between the grid and cathode of tube 48, the circuit is designed so that the rectifier 12 is excited to approximately 50% of its rated output and both contacts 22 and 24 are open. When the speed of the processing line increases above the desired predetermined speed, the grid becomes more negative than the cathode, and the voltage output of rectifier 12 is reduced, thereby lowering the line operating speed. When the speed of the processing line decreases below the desired predetermined speed, the grid becomes more positive than the cathode and the voltage of rectifier 12 is increased, which in turn, raises the line speed. It will be seen that in the event the line speed deviates from the preset speed by an amount which causes the detector tube 48 to increase the voltage of rectifier 12 to approximately 60% of its rating, the relay 104 will be energized to move the motor operated rheostat 18 to increase the operating line speed to approximately the correct value, after which the relay 104 is deenergized. A deviation in line speed sufficient to lower the voltage output of rectifier 12 to approximately 40% of its rating, will cause relay 106 to be deenergized and its normally closed contact 24 will close to lower the motor operated rheostat 18 to reduce the line operating speed to approximately the correct value. The detector tube 48 will then conduct more current and the voltage output from rectifier 12 will increase sufficiently to energize relay 106 to open contact 24 to stop the travel of the sliding arm 16.

In summary, it will be seen that when the line speed is changing rapidly, one of the contacts 22 and 24 will be closed so as to quickly bring the speed to approximately the predetermined rate. When the output of rectifier 12 is between 40 and 60% of its rating, both contacts 22 and 24 are open and the speed is controlled by the change in value of the voltage drop across resistance 14, this acting as a vernier. Thus the speed is maintained at the value predetermined by the setting of arm 44.

When it is desired to operate the line at a high speed, the switch 50 is opened and switch 52 closed. This connects line 56 to potentiometer 40 which is adjusted to the desired position by means of the contact arm 46. This gives a more positive potential on the wire 56 which results in a positive potential being applied to the grid element 48G as referred to the cathode element 48C and causes the tube 48 to conduct a greater amount of current, which in the manner described above, rapidly increases the voltage on rectifier 12 and accelerates the processing line to approximately the correct speed as predetermined by the setting of potentiometer 40. The relay 104 is then deenergized, stopping the rheostat travel and the electronic regulator assumes control of the speed. To reduce the line operating speed to a low speed, switch 52 is opened and switch 50 closed. This causes tube 48 to conduct less current, which in the manner described above, rapidly reduces the voltage output from rectifier 12 and decelerates the line to the correct speed as predetermined by the setting of the movable contact arm 44.

To stop the line, switch 54 is opened. This causes the grid 48G to become negative with respect to the cathode 48C as a result of the connection of the grid 48G through resistor 122 and the negative terminal of rectifier 118. Since the cathode 48C is connected to the voltage dividing resistor 126, the voltage on grid 48G will remain at a relatively great and constant negative potential when referred to the cathode as long as the switch 54 is open. The negative potential applied to the grid 48G causes the detector tube to cease conduction which lowers the voltage output of rectifier 12. This deenergizes relay 106, thus closing the normally closed contact 24 which brings the line to rest in the manner described above. The line will remain at rest until the switch 54 is closed.

The circuit consisting of switch 134 and potentiometer 130 permits simulating all operations when the line is at rest and enables performance of the entire regulator and equipment to be checked. When the line is at rest there is no voltage drop across voltage dividing resistor 64, so that the grid element 48G is negative with respect to the cathode element 48C. Since the cathode element 48C is connected to the adjustable contact of voltage dividing resistor 126, the voltage on grid 48G will remain at a relatively great negative potential with respect to the cathode element 48C, except during periods of testing when the switch 134 is closed. Closing of the switch 134 connects the grid 48G to the movable contact 132 of potentiometer 130. The conduction of tube 48 may be varied from zero conduction to maximum conduction by adjusting the contact 132. In the manner described above the degree of conduction of tube 48 controls the voltage output from rectifier 12 so that by adjusting the movable contact arm 132 all functions of the regulator may be readily tested. The volt meter 112, connected across the direct current terminals of rectifier 12 provides a convenient means for testing the effect of the regulator.

While one embodiment of my invention has been shown and described, it will be apparent that other adaptations and modifications may be made without departing from the scope of the following claims.

I claim:

1. A speed regulator for a motor driven from a generator having a field winding which comprises a detector tube having cathode and grid elements and an anode, a constant potential direct current source, a tachometer generator driven at a speed proportional to the motor speed, a grid cathode circuit, said tachometer generator and direct current source being connected in said grid cathode circuit, a pair of tubes, a phase shift network controlled by the flow of current through the detector tube for changing the phase angle of the pair of tubes, a controlled voltage source, a circuit controlled by the output of the pair of tubes for varying the flow of current to the controlled voltage source, and means responsive to the output of said controlled voltage source for varying the amount of current flowing in said winding.

2. A speed regulator according to claim 1 in which the means for varying the amount of current flowing in said winding includes a pair of relays connected in parallel across the output terminals of said controlled voltage source, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

3. A speed regulator according to claim 1 in which the means for varying the amount of current flowing in said winding includes a variable resistance connected across the output terminals of said controlled voltage source, a tap on said variable resistance leading to the field winding, a pair of relays connected in parallel across the output terminals of said controlled voltage source, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

4. A speed regulator for a motor driven from a generator having a field winding which comprises a detector tube having a plate, a cathode element and a grid element, a constant potential direct current source, a tachometer generator driven at a speed proportional to the motor speed, a grid cathode circuit, said tachometer generator and direct current source being connected in said grid cathode circuit, a rectifier, the plate of said tube being connected to the positive terminal of said rectifier, the grid of said tube being connected to the negative terminal of said rectifier, a variable resistance connected across the said terminals, a tap from said variable resistance being connected to the cathode of said tube, a reactor having its saturating winding in the connection between the plate and the positive terminal of the rectifier, a pair of tubes, a phase shift network including said reactor for changing the phase angle of said pair of tubes, a second rectifier, a circuit controlled by the output of the pair of tubes for varying the flow of current to the second rectifier, and means responsive to the output of said second rectifier for varying the amount of current flowing in said winding.

5. A speed regulator according to claim 4 in which the means for varying the amount of current flowing in said winding includes a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

6. A speed regulator according to claim 4 in which the means for varying the amount of current flowing in said winding includes a variable resistance connected across the output terminals of said second rectifier, a tap on said variable resistance leading to the field winding, a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

7. A speed regulator for a motor driven from a generator having a field winding which comprises a detector tube having a plate, a cathode element and a grid element, a constant potential direct current source, a tachometer generator driven at a speed proportional to the motor speed, a grid cathode circuit, said tachometer generator and direct current source being connected in said grid cathode circuit, a rectifier, the plate of said tube being connected to the positive terminal of said rectifier, the grid of said tube being connected to the negative terminal of said rectifier, a variable resistance connected across the said terminals, a tap from said variable resistance being connected to the cathode of said tube, a reactor having its saturating winding in the connection between the plate and the positive terminal of the rectifier, a pair of tubes, a phase shift network including said reactor for changing the phase angle of said pair of tubes, a transformer, a circuit including the primary of said transformer, the flow of current in said last named circuit being controlled by the pair of tubes, a second rectifier connected to the secondary winding of the transformer, a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

8. A speed regulator according to claim 7 including a second variable resistance connected across said second rectifier, and a tap on said second variable resistance leading to the field winding.

9. A speed regulator for a motor driven from a generator having a field winding which comprises a detector tube having a plate, a cathode element and a grid element, a constant potential direct current source, a tachometer generator driven at a speed proportional to the motor speed, a grid cathode circuit, said tachometer generator and direct current source being connected in said grid cathode circuit, a rectifier, the plate of said tube being connected to the positive terminal of said rectifier, the grid of said tube being connected to the negative terminal of said rectifier, a variable resistance connected across the said terminals, a tap from said variable resistance being connected to the cathode of said tube, a reactor having its saturating winding in the connection between the plate and the positive terminal of the rectifier, a pair of tubes, a phase shift network including said reactor for changing the phase angle of said pair of tubes, a second reactor having its control winding connected in circuit with said pair of tubes, a transformer, a circuit connecting the second reactor to the primary winding of the transformer, a second rectifier connected to the secondary winding of the transformer, and means responsive to the output of said second rectifier for varying the amount of current flowing in said winding.

10. A speed regulator according to claim 9 in which the means for varying the amount of current flowing in said winding includes a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

11. A speed regulator according to claim 9 in which the means for varying the amount of current flowing in said winding includes a variable resistance connected across the output terminals of said second rectifier, a tap on said variable resistance leading to the field winding, a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

12. A speed regulator for a motor driven from a generator having a field winding which comprises a detector tube having a plate, a cathode element and a grid element, a constant potential direct current source, a circuit connecting said direct current source to the cathode of said tube, a transformer, the secondary of said transformer being connected in said circuit, a tachometer generator driven at a speed proportional to the motor speed, a grid cathode circuit, said tachometer generator being connected in said grid cathode circuit, a rectifier, the plate of said tube being connected to the positive terminal of said rectifier, the grid of said tube being connected to the negative terminal of said rectifier, a variable resistance connected across the said terminals, a tap from said variable resistance connected to the cathode of said tube, a reactor having its saturating winding in the connection between the plate and the positive terminal of the rectifier, a pair of tubes, a phase shift network including said reactor for changing the phase angle of said pair of tubes, a second reactor having its control winding connected in circuit with said pair of tubes, a second transformer, a circuit connecting the second reactor to the primary winding of the second transformer, a second rectifier connected to the secondary winding of the second transformer, a second variable resistance connected across said second rectifier, a tap on said second variable resistance leading to the field winding, a pair of relays connected in parallel across the output terminals of said second rectifier, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

13. A speed regulator for a motor driven from a generator having a field winding which comprises a detector tube having cathode and grid elements and an anode, a constant potential direct current source, a tachometer generator driven at a speed proportional to the motor speed, a grid cathode circuit, said tachometer generator and direct current source being connected in said grid cathode circuit, a controlled voltage source, means controlled by the flow of current through said tube for varying the amount of current flowing to said controlled voltage source, and means responsive to the output of said controlled voltage source for varying the amount of current flowing in said winding, said last named means including a pair of relays connected in parallel across the output terminals of said controlled voltage source, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

14. A speed regulator for a motor driven from a generator having a field winding which comprises a detector tube having cathode and grid elements and an anode, a constant potential direct current source, a tachometer generator driven at a speed proportional to the motor speed, a grid cathode circuit, said tachometer generator and direct current source being connected in said grid cathode circuit, a controlled voltage source, means controlled by the flow of current through said tube for varying the amount of current flowing to said controlled voltage source, and means responsive to the output of said controlled voltage source for varying the amount of current flowing in said winding, said last named means including a variable resistance connected across the output terminals of said controlled voltage source, a tap on said variable resistance leading to the field winding, a pair of relays connected in parallel across the output terminals of said controlled voltage source, a resistance in series with each of said relays, said resistances being of different values so that the relays will be energized at different voltages, a motor operated potentiometer connected in series with the field winding, and alternative control circuits for the motor of the potentiometer, one of said relays having a normally open contact in one of said alternative control circuits and the other having a normally closed contact in the other of said alternative control circuits.

GEORGE H. RENDEL.

REFERENCES CITED

The following references are of record in the file of this patent:

UNITED STATES PATENTS

| Number | Name | Date |
|---|---|---|
| 2,335,874 | Moyer et al. | Dec. 7, 1943 |